(12) United States Patent
Lim

(10) Patent No.: US 10,382,414 B2
(45) Date of Patent: Aug. 13, 2019

(54) METHOD, SYSTEM AND RECORDING MEDIUM FOR SERVICE ACCOUNT AUTHENTICATION

(71) Applicant: CAMP MOBILE CORPORATION, Seoul (KR)

(72) Inventor: Seung Phill Lim, Seoul (KR)

(73) Assignee: Camp Mobile Corporation, Seoul (KR)

( * ) Notice: Subject to any disclaimer, the term of this patent is extended or adjusted under 35 U.S.C. 154(b) by 4 days.

(21) Appl. No.: 14/632,807

(22) Filed: Feb. 26, 2015

(65) Prior Publication Data
US 2016/0065553 A1    Mar. 3, 2016

(30) Foreign Application Priority Data
Aug. 26, 2014  (KR) .................. 10-2014-0111414

(51) Int. Cl.
| | | |
|---|---|---|
| G06F 7/04 | (2006.01) | |
| G06F 15/16 | (2006.01) | |
| G06F 17/30 | (2006.01) | |
| H04L 29/06 | (2006.01) | |
| G06Q 50/00 | (2012.01) | |

(Continued)

(52) U.S. Cl.
CPC .............. *H04L 63/08* (2013.01); *G06F 21/40* (2013.01); *G06Q 50/01* (2013.01); *H04L 67/22* (2013.01)

(58) Field of Classification Search
CPC ....................................... G06F 21/40
See application file for complete search history.

(56) References Cited

U.S. PATENT DOCUMENTS

| | | | | |
|---|---|---|---|---|
| 8,160,943 B2* | 4/2012 | Smith | .................... | G06Q 20/10 |
| | | | | 705/35 |
| 8,185,646 B2* | 5/2012 | Headley | .................. | G06F 21/32 |
| | | | | 709/225 |

(Continued)

FOREIGN PATENT DOCUMENTS

| | | | |
|---|---|---|---|
| JP | 2005062975 A | | 3/2005 |
| JP | 2007514333 A | | 5/2007 |

(Continued)

OTHER PUBLICATIONS

J. Constine, "Facebook Has Users Identify Friends in Photos to Verify Accounts, Prevent Unauthorized Access," SocialTimes, Jul. 26, 2010. [Online]. Available at: http://www.adweek.com/socialtimes/facebook-photos-verify/243870. [Accessed: Feb. 19, 2016].*

(Continued)

*Primary Examiner* — Lynn D Feild
*Assistant Examiner* — Vadim Savenkov
(74) *Attorney, Agent, or Firm* — Greer, Burns & Crain, Ltd.

(57) ABSTRACT

Disclosed are a method, system, and storage medium for service account authentication. A user authentication method includes managing authentication information associated with a service account of a user and social information about the user; and performing user authentication with respect to the service account through a stepwise procedure in which an authentication method using the authentication information and an authentication method using the social information are combined.

16 Claims, 9 Drawing Sheets

(51) Int. Cl.
  *H04L 29/08* (2006.01)
  *G06F 21/40* (2013.01)

(56) References Cited

U.S. PATENT DOCUMENTS

| | | | | |
|---|---|---|---|---|
| 8,522,147 B2* | 8/2013 | Bladel | ................ | G06Q 50/01 |
| | | | | 455/410 |
| 8,806,598 B2* | 8/2014 | Assam | ................ | H04L 63/08 |
| | | | | 726/7 |
| 8,819,789 B2* | 8/2014 | Orttung | ................ | G06F 21/40 |
| | | | | 705/318 |
| 8,832,788 B1* | 9/2014 | Gibson | ................ | G06F 21/40 |
| | | | | 713/155 |
| 8,997,240 B1* | 3/2015 | Kohen | ................ | G06F 21/31 |
| | | | | 713/182 |
| 9,185,095 B1* | 11/2015 | Moritz | ................ | H04L 63/08 |
| 10,003,663 B2* | 6/2018 | Torgersrud | ............ | H04L 67/22 |
| 2010/0250676 A1* | 9/2010 | Ufford | ................ | G06Q 10/107 |
| | | | | 709/204 |
| 2011/0016534 A1* | 1/2011 | Jakobsson | ............ | G06F 21/316 |
| | | | | 726/28 |
| 2011/0113098 A1* | 5/2011 | Walsh | ................ | G06Q 10/00 |
| | | | | 709/204 |
| 2012/0159647 A1* | 6/2012 | Sanin | ................ | H04L 51/32 |
| | | | | 726/28 |
| 2012/0192258 A1* | 7/2012 | Spencer | ............ | H04W 12/06 |
| | | | | 726/7 |
| 2012/0198491 A1* | 8/2012 | O'Connell | ............ | G06F 21/55 |
| | | | | 725/30 |
| 2012/0226701 A1* | 9/2012 | Singh | ................ | G06F 21/40 |
| | | | | 707/748 |
| 2012/0227087 A1* | 9/2012 | Brown | ................ | G06Q 50/01 |
| | | | | 726/3 |
| 2013/0151617 A1* | 6/2013 | Davis | ................ | H04L 67/02 |
| | | | | 709/204 |
| 2013/0305336 A1* | 11/2013 | Konertz | ............ | H04L 67/306 |
| | | | | 726/7 |
| 2014/0143326 A1* | 5/2014 | Rajaram | ............ | G06Q 50/01 |
| | | | | 709/204 |
| 2014/0189829 A1* | 7/2014 | McLachlan | ........ | G06Q 20/4014 |
| | | | | 726/6 |
| 2015/0242616 A1* | 8/2015 | Oprea | ................ | G06F 21/445 |
| | | | | 726/1 |

FOREIGN PATENT DOCUMENTS

| | | |
|---|---|---|
| JP | 2012203756 A | 10/2012 |
| KR | 10-1222471 | 1/2013 |
| KR | 10-2013-0082911 | 7/2013 |

OTHER PUBLICATIONS

Korean Office Action dated Oct. 23, 2015 by the Korean Patent Office corresponding to Korean patent application No. 10-2014-0111414.

Japanese Office Action dated Sep. 11, 2018 by the Japanese Patent Office corresponding to Japanese patent application No. 2014-250082.

Matsumoto Toru, "Do not need a digital certificate for identity verification? Securitization of electronic settlement is secured throughout the system"; Nikkei Business Publications, Inc., Nikkei Business Publications, Inc., Japan, Nov. 1, 1999, No. 53 , p. 2 (literature showing known technology).

* cited by examiner

METHOD, SYSTEM AND RECORDING MEDIUM FOR SERVICE ACCOUNT AUTHENTICATION

CROSS-REFERENCE TO RELATED APPLICATION

This application claims priority from and the benefit of Korean Patent Application No. 10-2014-0111414, filed on Aug. 26, 2014, which is hereby incorporated by reference for all purposes as if fully set forth herein.

BACKGROUND

Example embodiments of the present invention relate to an authentication technology for performing a user authentication with respect to a service account.

With the development in performance of electronic devices and with the greater supply and spread of network communication, a variety of services are provided through a network. Due to the increased supply of mobile terminals, for example, smartphones, equipped with a network communication function and an information search function such as in the Internet, uses of various applications installable and available on the mobile terminals are also on the increase.

Among services provided by applications, some services such as social network services (SNS), require user authentication to be performed in order to use all of or a portion of the application related services on a mobile terminal.

As an example of an authentication technology, Korean Registration Patent No. 10-1222471 registered on Jan. 9, 2013, discloses a technology for performing an online authentication using an identifier (ID) and a password on the Internet or other mobile communication networks.

Currently, a service account of an SNS may employ an authentication method based on a telephone number. For example, an account may be created through a one-time short message service (SMS) authentication per each telephone number.

However, when various circumstances, such as replacing a terminal, changing a telephone number, or replacing a subscriber identification module (SIM) card, occur, user authentication using a telephone number may require a re-authentication with respect to the service account of the user. However, the user may not be authenticated with an existing telephone number An authentication technology using an email address or password input method in addition to a telephone number is present. However, in many cases, user authentication fails during a re-authentication procedure when a user forgets an email address or a password registered at the time of joining.

SUMMARY

Example embodiments provide a user authentication method and system, and a recording medium that may overcome issues occurring due to a red-tape authentication procedure in a service account and forgetting authentication information corresponding to the service account.

Example embodiments also provide a user authentication method and system, and a recording medium that may perform user authentication without using authentication information used in a service account, such as a telephone number, an email address, and an identifier (ID).

Example embodiments also provide a user authentication method and system, and a recording medium that may more conveniently perform user authentication using social data of a user in harmonization with a fundamental use type of a social service.

Additional features of the example embodiments will be set forth in the description which follows, and in part will be apparent from the description, or may be learned by practice of the example embodiments.

Example embodiments disclose a user authentication method, including managing authentication information associated with a service account of a user and social information about the user, and performing a user authentication with respect to the service account through a stepwise procedure in which an authentication method using the authentication information and an authentication method using the social information are combined. In the stepwise procedure, an authentication procedure for performing the user authentication using initial join details initially registered to create the service account or change details about the initial join details and an authentication procedure for performing the user authentication using social information including at least one of service use information of the service account and personal relationship information may be combined.

Example embodiments also disclose a user authentication system, including a manager configured to manage authentication information associated with a service account of a user and social information about the user, and an authentication processor configured to perform a user authentication with respect to the service account through a stepwise procedure in which an authentication method using the authentication information and an authentication method using the social information are combined. In the stepwise procedure, an authentication procedure for performing the user authentication using initial join details initially registered to create the service account or change details about the initial join details and an authentication procedure for performing the user authentication using social information including at least one of service use information of the service account and personal relationship information may be combined.

It is to be understood that both the foregoing general description and the following detailed description are explanatory and are intended to provide further explanation of the example embodiments as claimed.

EFFECT OF EXAMPLE EMBODIMENTS

According to example embodiments, it is possible to enhance an existing authentication procedure and to outperform inconvenience and issues occurring due to an authentication failure by performing a stepwise authentication through an organic connection between a plurality of authentication methods or by performing an additional authentication based on a risk level associated with a user.

According to example embodiments, it is possible to achieve a service enhancement by performing user authentication through a stepwise method in preparation for various circumstances arising from a replacement of a terminal or a subscriber identification module (SIM) card and a change of a telephone number, and to further increase the quality of service by securing usability through enhancement of a user convenience.

According to example embodiments, without using authentication information used as a service account such as a telephone number, an email address, and an identifier ID, it is possible to perform user authentication using social data and to further enhance the reliability of a service through more convenient authentication based on a fundamental use type of a social service.

BRIEF DESCRIPTION OF THE DRAWINGS

The accompanying drawings, which are included to provide further understanding of the example embodiments and are incorporated in and constitute a part of this specification, illustrate example embodiments, and together with the description serve to explain the principles of the example embodiments.

DETAILED DESCRIPTION OF EXAMPLE EMBODIMENTS

Figure 1:
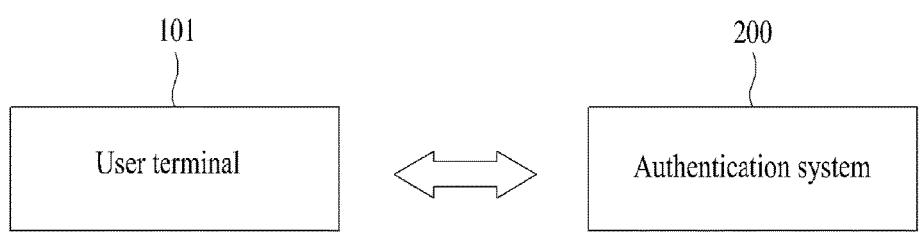
FIG. 1 is a diagram illustrating a relationship between a user terminal and an authentication system according to an example embodiment.

The invention is described more fully hereinafter with reference to the accompanying drawings, in which example embodiments are shown. This invention may, however, be embodied in many different forms and should not be construed as limited to the example embodiments set forth herein. Rather, these example embodiments are provided so that this disclosure is thorough, and will fully convey the scope of the invention to those skilled in the art. In the drawings, the size and relative sizes of layers and areas may be exaggerated for clarity. Like reference numerals in the drawings denote like elements.

Example embodiments will now be described more fully with reference to the accompanying drawings in which example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments to those of ordinary skill in the art. In the drawings, the thicknesses of layers and areas are exaggerated for clarity. Like reference numerals in the drawings denote like elements, and thus their description may be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, example embodiments will be described with reference to the accompanying drawings.

Example embodiments relate to a technology for authenticating a user, and may be applied to any type of services requiring authentication in order to use at least a portion of a service, for example, a social network service (SNS), a messenger service, and a game service.

FIG. 1 is a diagram illustrating a relationship between a user terminal and an authentication system according to an example embodiment. FIG. 1 illustrates a user terminal 101 and an authentication system 200. An indicator with an arrow head indicates that data may be transmitted and received between the user terminal 101 and the authentication system 200 over a wired/wireless network.

The user terminal 101 may be a personal computer (PC), a laptop computer, a smartphone, a tablet, and a wearable computer, and may refer to any type of terminal devices capable of connecting to a website/mobile site associated with the authentication system 100 or installing and executing a service exclusive application. Here, the user terminal 101 may perform the overall service operations such as a service screen configuration, a data input, a data transmission and reception, and data storage, under the control of the website/mobile site and the exclusive application.

The authentication system 200 may include a service server (not shown) that provides the user terminal 101 corresponding to a client with a service such as an SNS, a messenger service, and a game service. In particular, the authentication system 200 includes a function of authenticating the user terminal 101 that is to connect to the service server and to use the service provided from the service server. As described above, the authentication system 200 may be included in a platform of the service server providing a service, and may be configured as a system separate from the service server to perform authentication processing required for a service through interaction with the service server.

Hereinafter, an example of user authentication in an SNS will be described.

Figure 2:
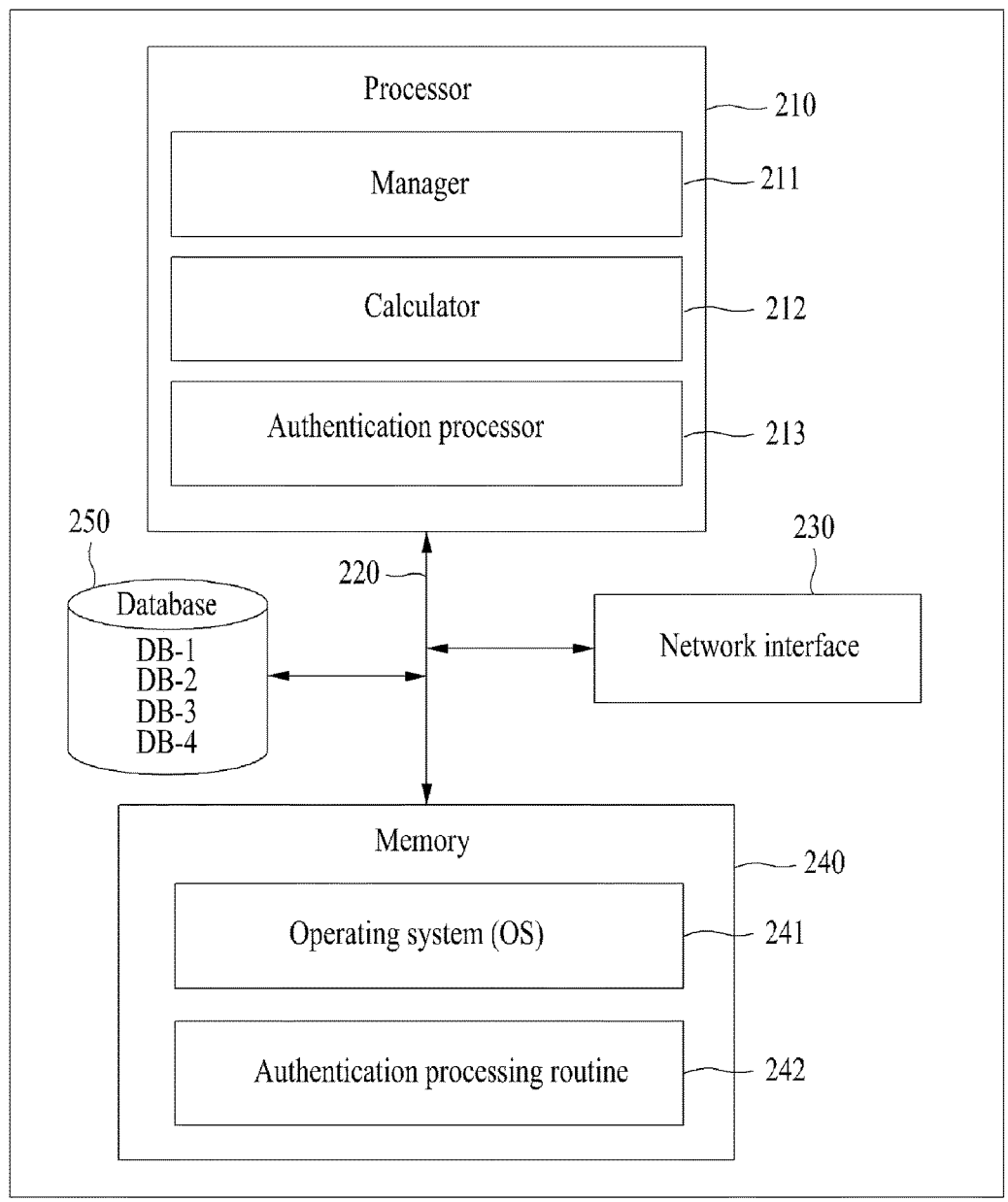
FIG. 2 is a block diagram illustrating a configuration of an authentication system according to one example embodiment.
Figure 3:
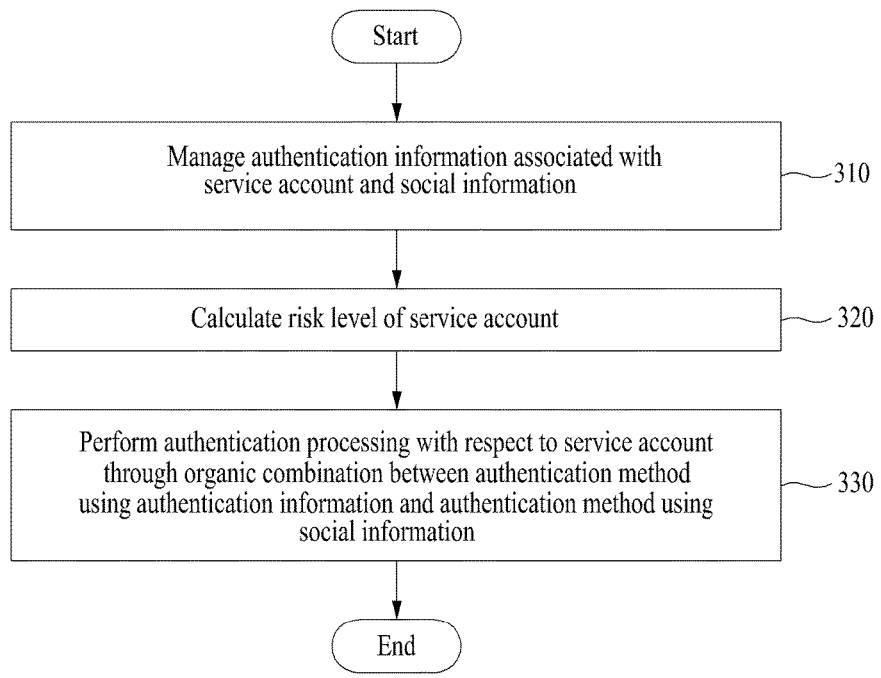
FIG. 3 is a flowchart illustrating an authentication method according to an example embodiment.

FIG. 2 is a block diagram illustrating a configuration of the authentication system 200 according to an example embodiment, and FIG. 3 is a flowchart illustrating an authentication method according to an example embodiment.

Referring to FIG. 2, the authentication system 200 includes a processor 210, a bus 220, a network interface 230, a memory 240, and a database 250. The memory 240 includes an operating system (OS) 241 and an authentication processing routine 242. The processor 210 includes a manager 211, a calculator 212, and an authentication processor 213. According to other example embodiments, the authentication system 200 may also include more number of constituent elements than the number of constituent elements of FIG. 2.

The memory 240 may include a permanent mass storage device, such as a random access memory (RAM), a real only memory (ROM), and a disc drive, as a computer-readable storage medium. Also, a program code for the OS 241 and the authentication processing routine 242 may be stored in the memory 240. Such software constituent elements may be loaded from another computer-readable storage medium separate from the memory 240 using a drive mechanism (not shown). Other computer-readable storage media may include, for example, a floppy drive, a disc, a tape, a DVD/CD-ROM drive, and a memory card. Software constituent elements may be loaded to the memory 240 through the network interface 230 instead of using the computer-readable storage medium.

The bus 220 enables communication and data transmission between the constituent elements of the authentication system 200. The bus 220 may be configured using a high-speed serial bus, a parallel bus, a storage area network (SAN), and/or another appropriate communication technology.

The network interface 230 may be a computer hardware constituent element for connecting the authentication system 200 to a computer network. The network interface 230 may connect the authentication system 200 to the computer network through a wireless or wired connection.

The database 250 serves to store and maintain, for each user, authentication information used to create a service account and social information associated with a user as information used to perform user authentication. For example, the database 250 may include a first database DB-1 that includes join details initially registered with an SNS by a user, a second database DB-2 that includes change details updated in response to a change in the initially registered join details, a third database DC-3 that includes service use information produced on the SNS in response to the user using the SNS, and a fourth database DB-4 that includes personal relationship information about a personal relationship established on the SNS in response to the user using the SNS. Although FIG. 2 illustrates that the database 250 is included in the authentication system 200, it is only an example. Accordingly, all of or a portion of databases 250 may be present as an external database constructed on a separate system.

The processor 210 may be configured to process an instruction of a computer program by performing basic calculations, logic, and input/output operations of the authentication system 200. Instructions may be provided from the memory 240 or the network interface 230 to the processor 210 through the bus 220. The processor 210 is configured to execute a program code for the manager 211, the calculator 212, and the authentication processor 213. The program code may be stored in a storage device such as the memory 240.

The manager 211, the calculator 212, and the authentication processor 213 may be configured to perform the operations of FIG. 3.

In operation 310, the manager 211 manages authentication information associated with a service account and social information as information used to perform an authentication. Here, the authentication information may include join details registered by a user to create a service account with an SNS, and may include identification information, for example, a telephone number, an email address, an identifier (ID)/password, and personal identification number (PIN) information, used to identify a user terminal using a corresponding service. The social information may include information created in response to the user using the SNS with the service account and may include service use information produced in response to a service use of the SNS and personal relationship information about a personal relationship established on the SNS.

Accordingly, the manager 211 manages, in the first database DB-1 for each user, SNS initial join details including identification information for identifying a user terminal as authentication information initially registered by the user to create an SNS account.

Also, the manager 211 verifies change details about the SNS initial join details, and may manage the change details in the second database DB-2. To this end, the manager 211 may provide the user with an alert function of verifying whether the initial join details are changed, before a change occurs in the initial join details. That is, the manager 211 may construct DB-2 by periodically or randomly verifying whether the initial join details are changed through the alert function and by updating the changed authentication information. For example, when main reasons causing a change in user join details generally include a number change by a SIM card replacement and a terminal replacement, the SIM card replacement generally occurs at intervals of about three month to two years and the terminal replacement generally occurs at intervals of about 1 year to 2 years. Based on a nation-based service index showing such characteristics, the manager 211 may randomly verify whether join details are changed every three month and may maintain DB-2 to be newest. A replacement period may differ for each country based on various promotions or fee policies. Here, the alert function may include a function capable of skipping in response to no change. In addition, the alert function may be activated when the use is performing an SNS environment setting or a terminal environment setting and may display a notification message for verifying whether join details are changed.

Although an example of managing change details (hereinafter, "SNS change details") about SNS initial join details is described to be managed in a separate DB, for example, DB-2, the SNS change details may be managed in DB-1 together with the SNS initial join details by updating the SNS initial join details stored in DB-1.

Also, the manager 211 manages, in the third database DB-3, service use information produced in response to the user using the SNS. That is, the manager 211 may collect service use information associated with SNS content as activity details of the user. For example, the manager 211 may construct, in DB-3, predetermined SNS use details such as creating a meeting on the SNS, posting comments, photos, music, and moving pictures, communicating with acquaintances through comments or chats, managing schedules, voting, playing a game, and tagging a location while the user is using the SNS.

The manager 211 manages, in the fourth database DB-4, personal relationship information about a personal relationship established on the SNS in response to the user using the SNS. That is, the user may communicate with many other users using various paths or methods while using the SNS. In response thereto, the manager 211 may manage a personal relationship database that is generated by establishing a relationship such as a friend or a member.

In operation 320, the calculator 212 calculates a risk level of a service account used by each user through an authentication procedure. As an example, the calculator 212 may calculate a risk level of a service account based on the frequency of change in the IP connections. As another example, the calculator 212 may calculate a risk level of a service account based on a location travel range per unit time of a user terminal by tracking a location using location information such as a global positioning system (GPS) or the service account. As still another example, the calculator 212 may calculate a risk level of a service account based on a reliability level associated with a service use based on an authentication request count and an authentication failure count, for example, a password error count. The calculator 212 may be omitted from constituent elements of the authentication system 200 depending on example embodiments.

In operation 330, the authentication processor 213 performs authentication processing with respect to the service account through an organic combination between an authentication method using authentication information and an authentication method using social information. In the present example embodiments, DB-1 through DB-4 may be used to perform a user authentication. In particular, an SNS member authentication method of including DB-1 and organically connecting and thereby using DB-2, DB-3, and DB-4 may be provided.

An authentication method using DB-1 corresponds to a primary authentication procedure identical to an existing method. For example, when a user inputs a telephone number as identification information for identifying a user terminal to initially create an SNS account, the telephone number may be stored in DB-1. When the user is to go through a re-authentication at the corresponding SNS due to circumstances such as in an SNS deletion and re-installation and a phone replacement, the authentication method may proceed with a process of transmitting an authentication number to the telephone number initially registered by the user through the SNS and matching the authentication number and the telephone number. The authentication method using DB-1 may also proceed with a different process based on a type of information used to create a service account. For example, the authentication method may proceed with a process of receiving again, from the user, a password initially registered by the user and then performing authentication processing or a process of performing authentication processing by transmitting an authentication code and a uniform resource locator (URL) including the authentication code to an email address registered at the time of initial join and through a connection using the URL.

An authentication method using DB-2 corresponds to a secondary authentication procedure in preparation for a case in which the authentication method using DB-1 fails in the user authentication, and performs authentication processing using authentication information stored in DB-2, for example, the change details verified in advance by the user. For example, when the user registers in advance change details about a telephone using an alert function, authentication processing may be performed by transmitting an authentication number to the telephone number stored in DB-2 although the authentication method using DB-1 fails in the user authentication due to a change of an actual telephone number.

An authentication method using DB-3 and an authentication method using DB-4 correspond to a tertiary authentication procedure proceeding as an additional authentication method when all of the authentication method using DB-1 and the authentication method using DB-2 fail or when a risk level of a service account is outside a setting level. Here, one of the authentication method using DB-3 and the authentication method using DB-4 may be selectively used. Alternatively, DB-3 and DB-4 may be organically combined and be used as a stepwise authentication means. For example, whether to proceed with an authentication method using DB-4 may be determined based on an authentication result of DB-3. Alternatively, a matching result of DB-3 may be used for the authentication method using DB-4.

Hereinafter, the authentication method using DB-3 and the authentication method using DB-4 will be described with reference to FIGS. 4 and 5. Each operation of the aforementioned authentication methods may be performed by the authentication processor 213 of FIG. 2.

Figure 4:
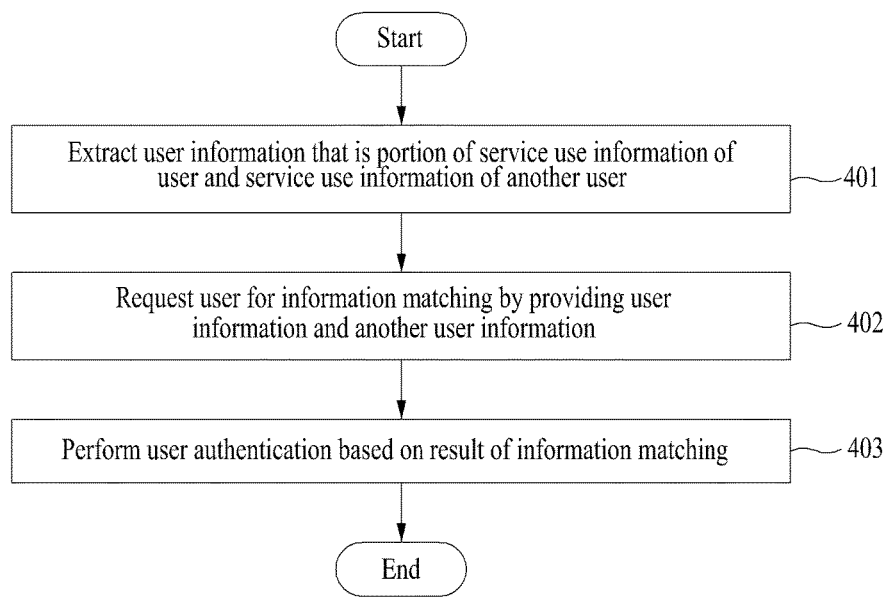
FIGS. 4 and 5 are flowcharts illustrating an authentication procedure using social information according to example embodiments.

FIG. 4 is a flowchart illustrating an authentication method using DB-3 according to one example embodiment.

In operation 401, the authentication processor 213 extracts, from DB-3 as authentication data to be used for a user authentication, a portion (hereinafter, "user information") of service use information of a user, and extracts, from DB-3, a portion (hereinafter, "another user information") of service use information of another user unassociated with the user. For example, user information may use a meeting created by the user, a member of the meeting, a writing, a photo, music, and a moving picture posted or commented by the user, a vote into which the user participates, and a location tagged by the user. Here, the other user information may be randomly extracted and the user information may be extracted by applying a random method or a predetermined criterion. As an example, the authentication processor 213 may preferentially extract, as user information, reactivity of content such as a reference count, a dialogue count, and a comment count. As another example, the authentication processor 213 may preferentially extract, as user information, a newest of content such as a posting time, a reference time, a dialogue time, and a comment registered time.

In operation 402, the authentication processor 213 requests a user that is a target to be authenticated for information matching by providing the user information and the other user information to the user. That is, as a method for proving that the user is the right user, the authentication processor 213 may make the user proceed with an authentication procedure of recognizing user information that is created in response to the user using an SNS and that is extracted from DB-3 as user information of the user. For example, the authentication processor 213 may request the user for information matching by displaying a plurality of photos uploaded on the SNS and requesting the user to select a photo directly uploaded by the user, by displaying a plurality of meetings created on the SNS and requesting the user to select a meeting directly created by the user or a meeting joined by the user, by requesting the user to select a member not included in the same meeting as the user, or by requesting the user to select a writing or a photo commented by the user from among writings or photos posted on the SNS.

In operation 403, the authentication processor 213 performs authentication processing with respect to a service account requested by the user, based on a result of matching the user information and the other user information. That is, the authentication processor 213 verifies that the user is the right user and authenticates the user based on service use information produced in response to the user using the SNS.

Figure 5:
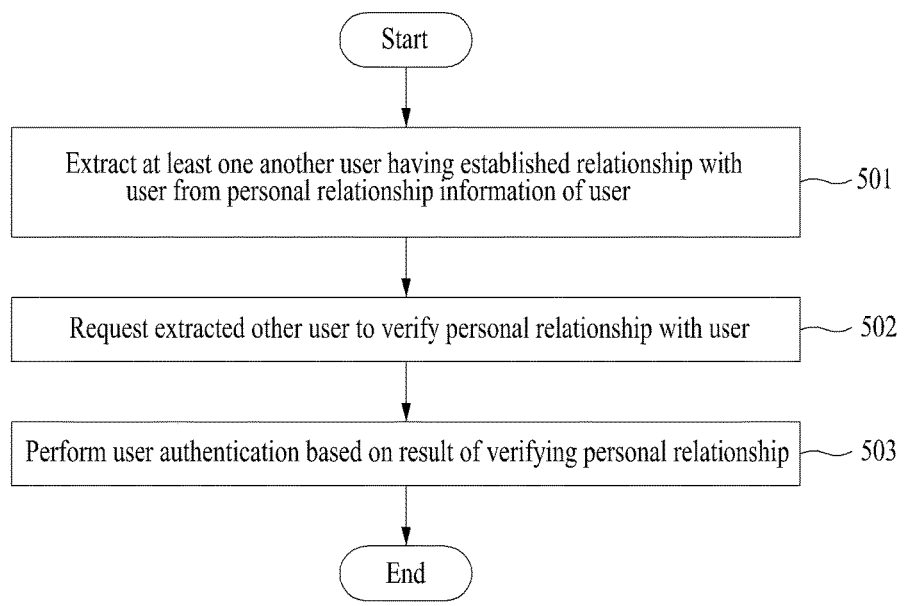

FIG. 5 is a flowchart illustrating an authentication method using DB-4 according to one example embodiment.

In operation 501, the authentication processor 213 extracts, as authentication data to be used for the user authentication, information about at least a portion of other users from personal relationship information of the user stored in DB-4. As an example, the authentication processor 213 may preferentially extract at least one another user from among other users having established a relationship with the user on the SNS, based on an exchange count or exchange frequency between the user and the other user such as a dialogue count exchanged between the user and the other user and a comment count. As another example, the authentication processor 213 may preferentially extract the other user based on a newest of a relationship setting such as a time at which a relationship has been established between the user and the other user on the SNS, for example, a time at which the user and the other user have become friends.

In operation 502, the authentication processor 213 requests the extracted other user to verify a personal relationship with the user. For example, when a user A frequently chats with users o, p, q, r, and s on an SNS, and when the user is to be authenticated, the authentication processor 213 may request the users o, p, q, r, s, and s to verify a personal relationship with the user A by transferring a predetermined message, for example, "User A's member authentication is ongoing. Please invite the user A" to the users o, p, q, r, and s by requesting the users o, p, q, r, and s to invite the user A.

In operation 503, the authentication processor 213 performs authentication processing with respect to a service account requested by the user, based on a result of verifying the personal relationship between the user and the other user. That is, as a method for enabling the user to be authenticated as the right user based on SNS personal relationship information, the authentication processor 213 may perform authentication processing by requesting an acquaintance connected to the user to verify a personal relationship with the user.

A variety of methods may be employed to organically connect and thereby use DB-1 through DB-4 in order to perform user authentication.

Hereinafter, examples of a stepwise authentication procedure in which a plurality of authentication methods is organically combined will be described.

Figure 6:
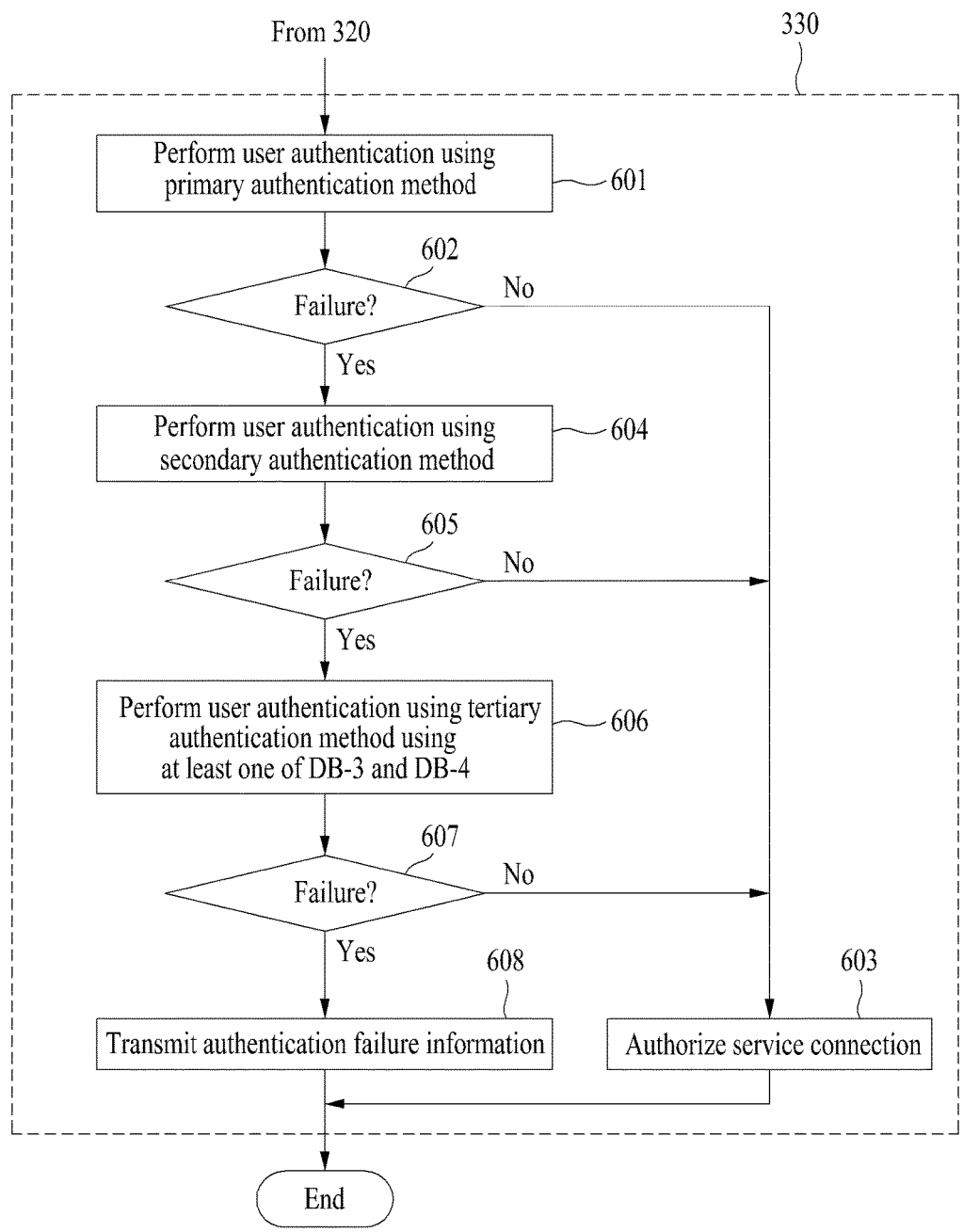
FIGS. 6 through 8 are flowcharts illustrating examples of a stepwise authentication procedure according to example embodiments.

FIG. 6 is a flowchart illustrating an example of an authentication procedure using DB-1 through DB-4 according to an example embodiment.

Referring to FIG. 6, in operation 601, the authentication processor 213 performs a user authentication using a primary authentication method using DB-1. When the primary authentication method succeeds in the user authentication in operation 602, the authentication processor 213 terminates the authentication procedure and authorizes a service connection to a user account in operation 603.

Conversely, when the primary authentication method fails in operation 602, the authentication processor 213 performs the user authentication using a secondary authentication method using DB-2 in operation 604.

When the secondary authentication method succeeds in the user authentication in operation 605, the authentication processor 213 terminates the authentication procedure and authorizes a service connection to the user account in operation 603.

Conversely, when even the second authentication method followed by the primary authentication method fails in operation 605, the authentication processor 213 performs the user authentication using a tertiary authentication method using at least one of DB-3 and DB-4 in operation 606.

Here, when the tertiary authentication method succeeds in the user authentication in operation 607, the authentication processor 213 authorizes a service connection to the user account in operation 603. Conversely, when the tertiary authentication method fails in the user authentication in operation 607, the authentication processor 213 transmits authentication failure information to a user having requested the authentication in operation 608.

Accordingly, when a primary authentication using DB-1 fails, the authentication processor 213 performs a secondary authentication using DB-2. When the secondary authentication also fails, the authentication processor 213 additionally performs a tertiary authentication using DB-3 and/or DB-4.

Figure 7:
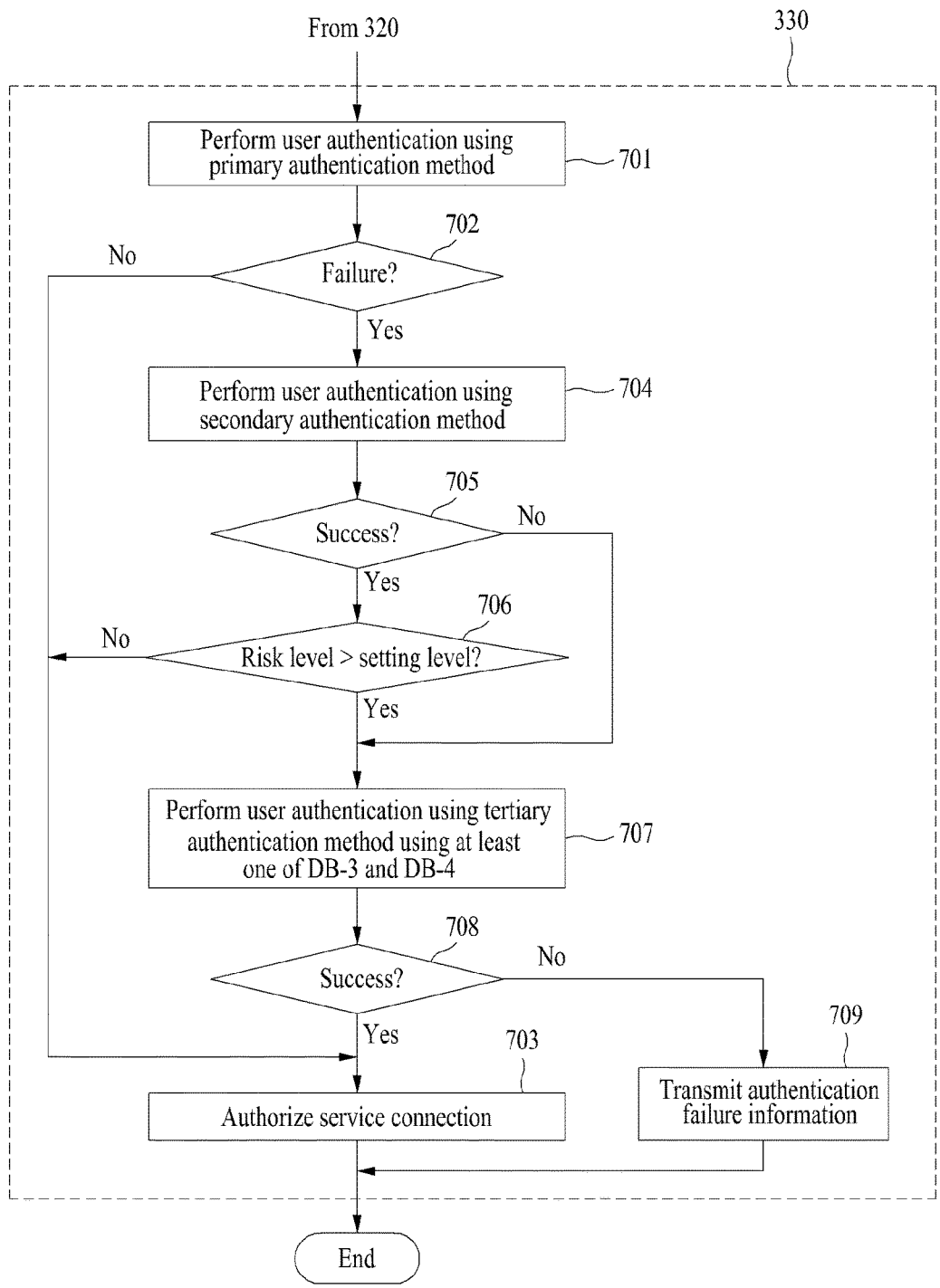

FIG. 7 is a flowchart illustrating an authentication procedure using DB-1 through DB-4 according to another example embodiment.

Referring to FIG. 7, in operation 701, the authentication processor 213 performs a user authentication using a primary authenticator method using DB-1. When the primary authentication method succeeds in the user authentication in operation 702, the authentication processor 213 terminates the authentication procedure and authorizes a service connection to a service account in operation 703.

Conversely, when the primary authentication method fails in the user authentication in operation 702, the authentication processor 213 performs the user authentication using a secondary authentication method using DB-2 in operation 704.

When the secondary authentication method succeeds in the user authentication in operation 705, the authentication processor 213 determines whether the risk level of the user account exceeds a predetermined setting level in operation 706.

Here, when the risk level of the user account is less than or equal to the setting level in operation 706, the authentication processor 213 terminates the authentication procedure and authorizes a service connection to the user account in operation 703.

Conversely, when the secondary authentication method fails in the user authentication in operation 705, or when the risk level of the user account exceeds the setting level in operation 706, the authentication processor 213 performs the user authentication using a tertiary authentication method using at least one of DB-3 and DB-4 in operation 707.

When the tertiary authentication method succeeds in the user authentication in operation 708, the authentication processor 213 authenticates a service connection to the user account in operation 703. Conversely, when the tertiary authentication method fails in the user authentication in operation 708, the authentication processor 213 transmits authentication failure information to the user having requested the authentication in operation 709.

Accordingly, when a primary authentication using DB-1 fails, the authentication processor 213 performs a secondary authentication using DB-2. In addition, when the risk level of a user account exceeds a setting level, the authentication processor 213 additionally perform a tertiary authentication using DB-3 and/or DB-4.

Figure 8:
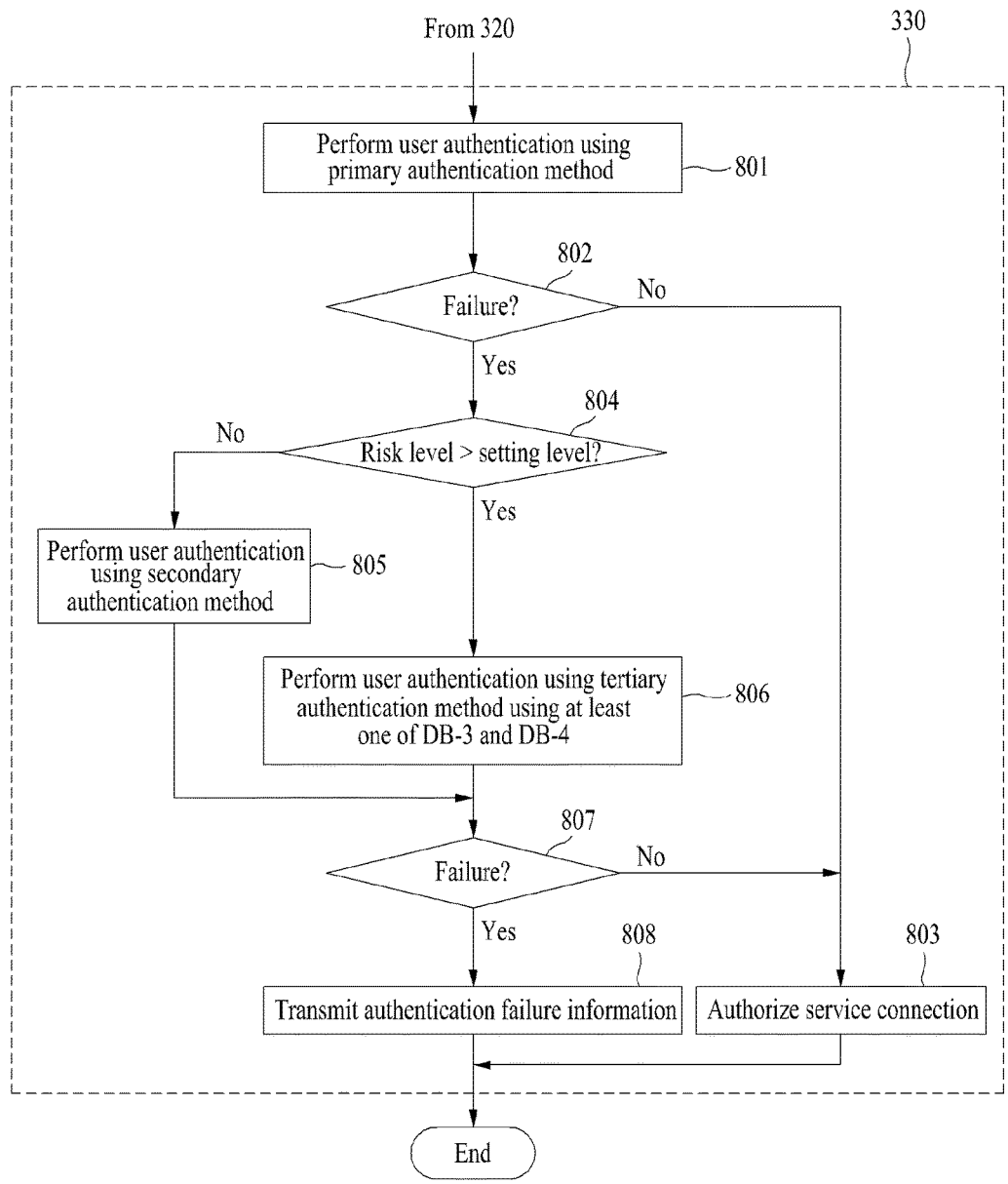

FIG. 8 is a flowchart illustrating still another authentication procedure using DB-1 through DB-4 according to further exemplary embodiment.

Referring to FIG. 8, in operation 801, the authentication processor 213 performs user authentication using a primary authentication method using DB-1. When the primary authentication method succeeds in the user authentication in operation 802, the authentication processor 213 terminates the authentication procedure and authorizes a service connection to a user account in operation 803.

Conversely, when the primary authentication method fails in the user authentication in operation 802, the authentication processor 213 determines whether the risk level of the user account exceeds a setting level in operation 804.

When the risk level of the user account is less than or equal to the setting level in operation 804, the authentication processor 213 performs the user authentication using a secondary primary method using DB-2 in operation 805. Conversely, when the risk level of the user account exceeds the setting level, the authentication processor 213 performs the user authentication using a tertiary authentication method using at least one of DB-3 and DB-4 in operation 806.

When the secondary authentication method or the tertiary authentication method succeeds in the user authentication in operation 807, the authentication processor 213 authorizes a service connection to the user account in operation 803. Conversely, when the secondary authentication method or the tertiary authentication method fails in the user authentication in operation 807, the authentication processor 213 transmits authentication failure information to a user having requested the authentication in operation 808.

Accordingly, when a primary authentication using DB-1 fails and when the risk level of a user account is less than or equal to a setting level, the authentication processor 213 performs a user authentication using DB-2. When the risk level of the user account exceeds the setting level, the authentication processor 213 may additionally perform the user authentication using DB-3 and/or DB-4.

As another embodiment, the authentication processor 213 may check the risk level of a user account prior to performing a user authentication. Here, when the risk level of the user account is within a setting level, that is, less than or equal to the setting level, the authentication processor 213 performs a user authentication using DB-1 and/or DB-2. When the risk level of the user account exceeds the setting level, the authentication processor 213 performs the user authentication using DB-3 and/or DB-4.

An authentication method using DB-1 and DB-2 may be preferentially applied to perform user authentication. When the user authentication is authorized using the authentication method using DB-1 and DB-2, an authentication procedure may be terminated. Conversely, when the authentication method using DB-1 and DB-2 fails in the user authentication, an authentication method using DB-3 and DB-4 may be applied. Here, when the user authentication is authorized using the authentication method using DB-3 and DB4, the authentication method using DB-1 and DB-2 may be applied again by requesting the user to verify change details about initial join details.

Dissimilar to the aforementioned embodiments, it is possible to verify whether join details of a user are changed using DB-2 prior to performing user authentication. In this embodiment, a user having no change details in DB-2 may go through an authentication procedure starting from a primary authentication process using DB-1. A user having change details in DB-2 may directly go through a secondary authentication operation by skipping the primary authentication process.

As another embodiment, when managing SNS change details by updating DB-1 instead of using a separate database, for example, DB-2, a separate authentication process using DB-2 may be omitted. Since the SNS change details may be verified from DB-1, a user having no change details may go through user authentication using SNS initial join details. A user having change details may go through user authentication using SNS change details.

An organic combination relationship between authentication methods is not limited to the aforementioned embodiments and thus, various modifications may be made based on a system environment such as a service policy or a database configuration.

Figure 9:
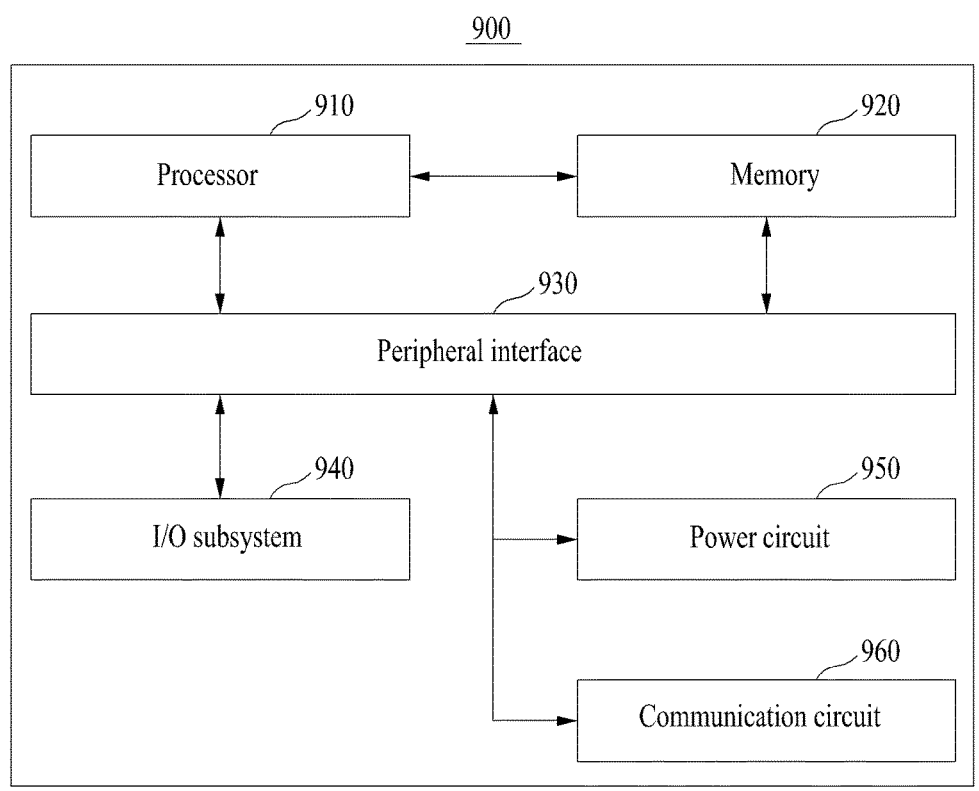
FIG. 9 is a block diagram illustrating an example of a configuration of a computer system according to one example embodiment.

FIG. 9 is a block diagram illustrating an example of a configuration of a computer system 900 according to one embodiment.

Referring to FIG. 9, the computer system 900 may include at least one processor 910, a memory 920, a peripheral interface 930, an input/output (I/O) subsystem 940, a power circuit 950, and a communication circuit 960. Here, the computer system 900 may correspond to a user terminal.

The memory 920 may include, for example, high-speed random access memory (RAM), a magnetic disk, static RAM (SRAM), a dynamic RAM (DRAM), a read only memory (ROM), flash memory, or a non-volatile memory. The memory 920 may include an instruction set, a variety of data, or a software module required for operating the computer system 900. Here, a connection to the memory 920 from another component such as the processor 910 or the peripheral interface 930 may be controlled by the processor 910.

The peripheral interface 930 may couple an input and/or output (I/O) peripheral device of the computer system 900 with the processor 910 and the memory 920. The processor 910 may perform a variety of functions for the computer system 900 and may process data by executing the software module or the instruction set stored in the memory 920.

The I/O subsystem 940 may couple various I/O peripheral devices with the peripheral interface 930. For example, the I/O subsystem 940 may include a controller configured to couple a monitor, a keyboard, a mouse, a printer, or if necessary, a peripheral device such as a touch screen or a sensor, with the peripheral interface 930. I/O peripheral devices may be coupled with the peripheral interface 930 without using the I/O subsystem 940.

The power circuit 950 may supply power to all of or a portion of components of a terminal. For example, the power circuit 950 may include a power management system, at least one power source such as a battery or alternating current (AC), a charging system, a power failure detection circuit, a power converter or inverter, a power state indicator, or predetermined other components for producing, managing, and distributing power.

The communication circuit 960 enables communication with another computer system using at least one external port. Alternatively, as described above, depending on a necessity, the communication circuit 960 enables communication with the other communication system by including a radio frequency (RF) circuit and by transmitting or receiving an RF signal known as an electromagnetic signal.

The example embodiments of FIG. 9 are only an example of the computer system 900, and the computer system 900 may include a reduced number of components of FIG. 9 or may further include an additional component not illustrated in FIG. 9, or may have a configuration or an arrangement in which at least two components are coupled. For example, the computer system 900 for a communication terminal of a mobile environment may further include a touch screen or a sensor in addition to components of FIG. 9. A circuit for RF communication using various communication methods for example, wireless fidelity (WiFi), third generation (3G), long term evolution (LTE), Bluetooth, near field communication (NFC), and ZigBee, may be included in the communication circuit 960. Components includable in the computer system 900 may be configured as hardware including an integrated circuit specialized for at least one signal processing or application, software, or a combination of hardware and software.

The methods according to the example embodiments may be recorded in non-transitory computer-readable media in an instruction form to be carried out through a variety of computer systems.

A program according to example embodiments may be configured as a PC-based program or an application exclusive for a mobile terminal. An application according to example embodiments may be configured in an independently operating program form or an in-app for of a predetermined application to be operable on the predetermined operation.

The methods according to example embodiments may be performed in such a manner that an application associated with a server system providing an SNS controls a user terminal. The application may be installed in the user terminal through a file that is provided from a file distribution system. For example, the file distribution system may include a file transmitter (not shown) configured to transmit the file in response to a request of the user terminal.

As described above, according to example embodiments, it is possible to enhance an existing authentication procedure and to outperform inconvenience and issues occurring due to an authentication failure by performing a stepwise authentication through an organic connection between a plurality of authentication methods or by performing additional authentication based on the risk level associated with a user. Also, according to example embodiments, it is possible to achieve a service enhancement by performing user authentication through a stepwise method in preparation for various circumstances arising from a replacement of a terminal or a subscriber identification module (SIM) card and a change of a telephone number, and to further increase a quality of service by securing usability through enhancement of user convenience. Also, According to example embodiments, without using authentication information used as a service account such as a telephone number, an email address, and an identifier ID, it is possible to perform user authentication using social data and to further enhance a reliability of a service through a more convenient authentication based on a fundamental use type of social service.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

It will be apparent to those skilled in the art that various modifications and variation can be made in the example embodiments without departing from the spirit or scope of the invention. Thus, it is intended that the example embodiments cover the modifications and variations of this invention, provided they come within the scope of the appended claims and their equivalents.

What is claimed is:

1. A method for authenticating a user terminal requesting access to a social network service provided by a computer server through a communication network, said method comprising:
    managing, in an authentication system in communication with the communication network and having a processor, authentication information associated with a service account of a user for the social network service and social information created by the user in response to the user using the social network service; and
    performing, in the authentication system, user authentication for determining whether to grant or deny said requested access by the user to the social network service using the authentication information and the social information with respect to the service account;
    wherein the authentication information associated with the service account includes initial join details initially registered to create the service account or change details about the initial join details, and the social information includes both service use information of the service account and personal relationship information established on the social network service in response to the user using the social network service;
    wherein the performing of the user authentication comprises:
    performing a primary authentication procedure using the initial join details or the change details about the initial join details;
    performing, in a stepwise authentication, a secondary authentication procedure using both the service use information of the service account and the personal relationship information in response to an authentication failure of the primary authentication procedure;
    wherein performing the user authentication using the personal relationship information includes,
        extracting, from the personal relationship information, at least one other user having established a relationship with the user through the social network service;
        requesting the other user to verify a personal relationship with the user; and
        processing the authentication of the user based on a result of verifying the personal relationship between the user and the other user, without requiring the user to input information relating to the user authentication.

2. The method of claim 1, wherein the managing of the authentication information comprises:
    managing the authentication information comprising the initial join details; and
    managing social information comprising at least one of service use information of the service account and personal relationship information.

3. The method of claim 1, further comprising:
    calculating a risk level of the service account,
    wherein the secondary authentication procedure is performed using the service use information of the service account and the personal relationship information in response to an authentication failure of the primary authentication procedure or the risk level exceeding a setting level.

4. The method of claim 1, further comprising:
    calculating a risk level of the service account,
    wherein the performing of the user authentication comprises:
    performing a first primary authentication procedure using the initial join details;
    determining whether the risk level exceeds a setting level in response to an authentication failure of the primary authentication procedure;
    performing a second primary authentication procedure using the change details about the initial join details in response to the risk level being less than or equal to the setting level; and
    performing the secondary authentication procedure using the service use information of the service account and the personal relationship information in response to the risk level exceeding the setting level.

5. The method of claim 1, further comprising:
    calculating a risk level of the service account,
    wherein the performing of the user authentication comprises:
    determining whether the risk level exceeds a setting level;
    performing a primary authentication procedure using the initial join details or the change details about the initial join details in response to the risk level being less than or equal to the setting level; and
    performing the secondary authentication procedure using the service use information of the service account and the personal relationship information in response to the risk level exceeding the setting level.

6. The method of claim 3, wherein the risk level is calculated based on at least one of an Internet protocol (IP) connection of a terminal used by the user, location information, an authentication request count, and an authentication failure count.

7. The method of claim 1, wherein the service use information is information associated with content of the service, and
    the extracting of the user information comprises extracting the user information based on at least one of reactivity and newest of the content.

8. The method of claim 1, wherein the other user is extracted based on at least one of an exchange count between the user and the other user and a relationship setting time.

9. The method of claim 1, wherein the performing the user authentication using the personal relationship information further comprises:
    extracting, as the social information, user information that is a portion of the service use information corresponding to details describing a use history of the user;
    extracting other user information that is a portion of service use information of at least one other user;
    providing the user information and the other user information to the user, and requesting the user to select the user information from among the user information and the other user information; and
    processing the secondary authentication of the user based on a result of selecting the user information.

10. The method of claim 1, wherein the managing of the authentication information includes periodically or at random times verifying whether an alert function has been activated by the user, indicating a change in the initial join details.

11. A user authentication system for authenticating a user terminal requesting access to a social network service provided by a computer server through a communication network, the system comprising:

a network interface configured to enable the use authentication system to communicate with the user terminal through the communication network;

a manager configured to manage authentication information associated with a service account of a user for the social network service and social information created by the user in response to the user using the social network service; and an authentication processor configured to perform user authentication for determining whether to grant or deny said requested access by the user to the social network service using the authentication information and the social information with respect to the service account;

wherein the authentication information associated with the service account includes initial join details initially registered to create the service account or change details about the initial join details and the social information includes both service use information of the service account and personal relationship information established on the social network service in response to the user using the social network service;

wherein the performing of the user authentication comprises:

performing a primary authentication procedure using the initial join details or the change details about the initial join details;

performing, in a stepwise authentication, a secondary authentication procedure using both the service use information of the service account and the personal relationship information in response to an authentication failure of the primary authentication procedure;

wherein performing the user authentication using the personal relationship information includes, extracting, from the personal relationship information, at least one other user having established a relationship with the user through the social network service;

requesting the other user to verify a personal relationship with the user; and processing the authentication of the user based on a result of verifying the personal relationship between the user and the other user, without requiring the user to input information relating to the user authentication.

12. The user authentication system of claim 11, further comprising:

a calculator configured to calculate a risk level of the service account, wherein the authentication processor is configured to perform the primary authentication procedure using the initial join details or the change details about the initial join details, and to perform the secondary authentication procedure using the service use information of the service account and the personal relationship information in response to an authentication failure of the primary authentication procedure or the risk level exceeding a setting level.

13. The user authentication system of claim 11, further comprising:

a calculator configured to calculate a risk level of the service account, wherein the authentication processor is configured to determine whether the risk level exceeds a setting level, to perform the primary authentication procedure using the initial join details or the change details about the initial join details in response to the risk level being less than or equal to the setting level, and to perform the secondary authentication procedure using the service use information of the service account and the personal relationship information in response to the risk level exceeding the setting level.

14. The method of claim 11, wherein the performing the user authentication using the personal relationship information further comprises:

extracting, as the social information, user information that is a portion of the service use information corresponding to details describing a use history of the user;

extracting other user information that is a portion of service use information of at least one other user;

providing the user information and the other user information to the user, and requesting the user to select the user information from among the user information and the other user information; and processing the secondary authentication of the user based on a result of selecting the user information.

15. The method of claim 11, wherein the managing of the authentication information includes periodically or at random times verifying whether an alert function has been activated by the user, indicating a change in the initial join details.

16. A non-transitory computer-readable medium storing instructions to control a computer system to perform user authentication of a user terminal requesting access to a social network service provided by a computer server through a communication network, the instructions comprising:

managing authentication information associated with a service account of a user for the social network service and social information created by the user in response to the user using the social network service; and performing a user authentication for determining whether to grant or deny said requested access by the user to the social network service using the authentication information and the social information with respect to the service account;

wherein the authentication information associated with the service account includes initial join details initially registered to create the service account or change details about the initial join details, the social information includes both service use information of the service account and personal relationship information established on the social network service in response to the user using the social network service;

wherein the performing of the user authentication comprises:

performing a primary authentication procedure using the initial join details or the change details about the initial join details;

performing, in a stepwise authentication, a secondary authentication procedure using both the service use information of the service account and the personal relationship information in response to an authentication failure of the primary authentication procedure;

wherein performing the user authentication using the personal relationship information includes, extracting, from the personal relationship information, at least one other user having established a relationship with the user through the social network service;

requesting the other user to verify a personal relationship with the user; and processing the authentication of the user based on a result of verifying the personal relationship between the user and the other user, without requiring the user to input information relating to the user authentication.

\* \* \* \* \*